Aug. 14, 1928.
D. F. ZOOK
1,680,716
OIL PURIFIER
Filed Nov. 5, 1926
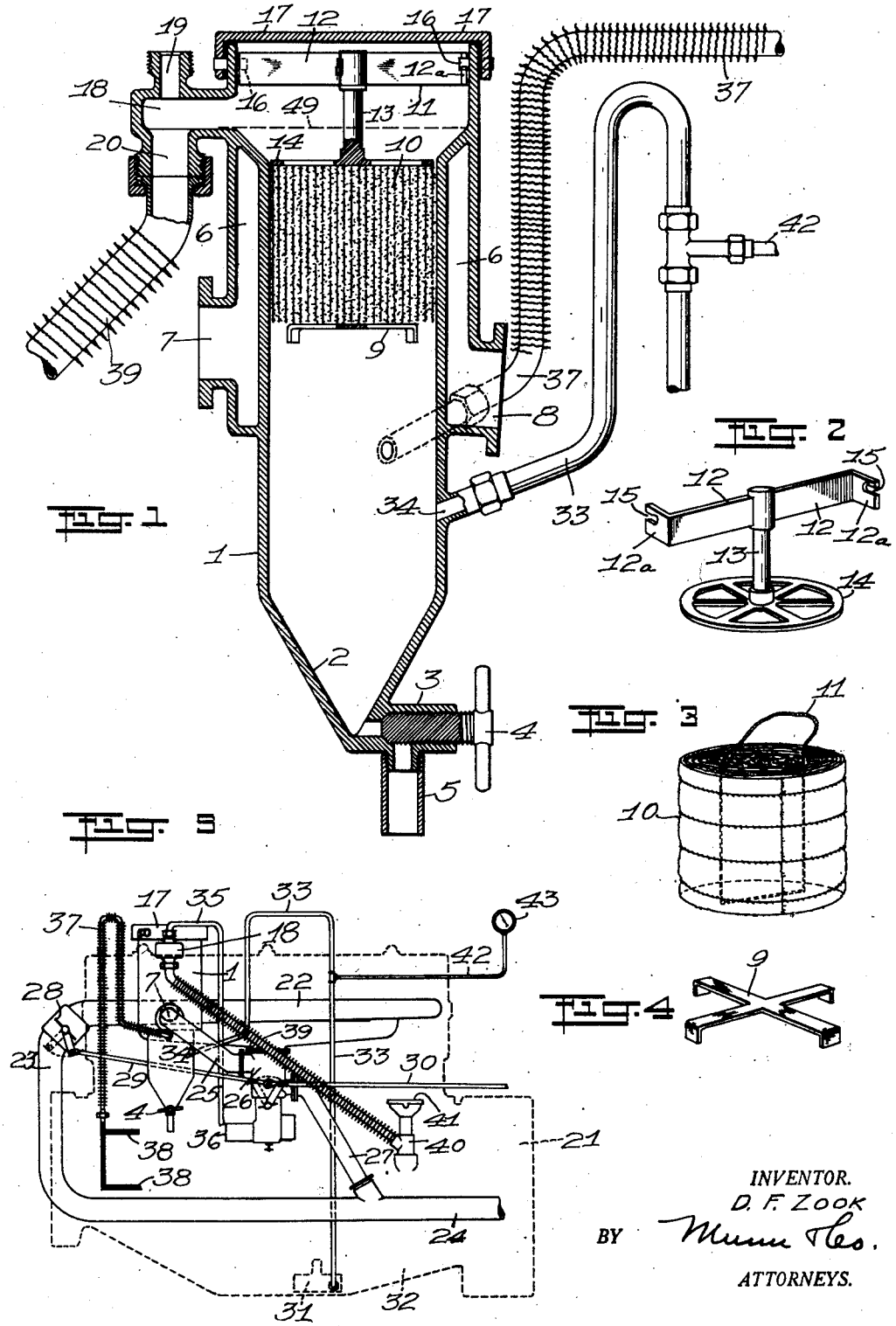
INVENTOR.
D. F. ZOOK
BY
ATTORNEYS.

Patented Aug. 14, 1928.

1,680,716

UNITED STATES PATENT OFFICE.

DAVID F. ZOOK, OF EVANSTON, ILLINOIS.

OIL PURIFIER.

Application filed November 5, 1926. Serial No. 146,460.

My invention relates to improvements in oil purifiers, especially those used in connection with automobile engines, and it consists in the combinations, constructions, and arrangements herein described and claimed.

A further object is to provide a device in which portions of the oil are heated so as to render them easily strained and to free them from gasoline vapors, the oil being subsequently cooled and returned to the crank case, while the vapors are passed to the carburetor intake.

A further object of the invention is to provide a purifier for removing foreign matter from lubricating oil of internal combustion engines without the use of floats, springs, levers, thermostats, valves, or any other moving parts.

A further object of the invention is to provide a purifier having a filtering device which may be readily removed or replaced and which is designed to make oil changing practically unnecessary by very frequent renewal of the filter instead.

A further object is to provide a purifier which may be readily opened to permit flushing and draining, without the necessity of a use of tools of any kind.

A further object is to provide an oil purifying system for internal combustion engines in which the clogging of the filter through neglect will not interfere with the proper functioning of the oiling system, but will permit the water and foreign matter to be removed and the oil to be cooled before it reaches the bearings.

A further object is to provide a purifying system in which all the oil first passes into the purifier, a portion of this oil being filtered and the remainder being passed partially clarified of sediment and water to the points of lubrication of the engine.

Other objects and advantages will appear in the following specification, and the novel features of the invention will be particularly pointed out in the appended claims.

My invention is illustrated in the accompanying drawings, forming part of this application, in which Figure 1 is a central vertical section through the purifier, certain connecting pipes being shown in elevation, Figure 2 is a perspective view of a portion of the purifier shown in Figure 1, Figure 3 is a perspective view of the filter roll, Figure 4 is a perspective view of a supporting spider, and Figure 5 is a diagrammatic view showing the general arrangement of the purifying system.

The oil purifier proper is shown in Figure 1. It consists of a body portion 1, which is preferably cylindrical and which has a conical shaped well 2 at the bottom thereof. A drain pipe 3 is provided with a valve 4, by means of which sediment in the well 2 may be discharged into the pipe 5.

The body portion 1 is provided with a surrounding heating chamber 6, having an inlet 7 and an outlet 8 for exhaust gases from the engine. In that portion of the purifier which is surrounded by the heating chamber 6 is a support 9 which is in the nature of a spider, as shown in Figure 4, the ends of the spider being secured to the inner walls of the body portion 1, such as by welding or in any other suitable manner. Disposed normally on this spider or support is a filter 10, which, in the present instance, is made of a roll of filter cloth held together in any suitable manner, and which is provided with a loop 11 which serves as a handle for lifting the filter out when it is desired to do so.

The top part of the body portion is expanded to receive the suspension bars 12 like those shown in Figure 2. The latter have secured thereto a downwardly extending rod 13 to which is secured a presser member 14. This presser member is preferably perforated so as to permit a free flow of oil, while keeping the filter in place. The bars 12 have laterally bent ends 12ª provided with slots 15 arranged to receive pins 16, so as to support the presser plate rigidly in position. The outer ends of the pins 16 are arranged to secure a cover 17 which may engage the pins by an ordinary bayonet joint, see Figure 5, so that a slight turn of the cover will permit it to be removed.

Communicating with the purifier above the filter is a branch pipe 18, having an upper outlet 19 and a lower outlet 20.

Referring now to Figure 5, I have shown therein the general outline of an internal combustion engine 21. This is provided with an exhaust manifold 22 which communicates by means of the pipe 23 with the discharge pipe 24. The oil purifier casing 1 is mounted in close proximity to the manifold 22 so as to receive the products of combustion into the heating chamber 6, where they may be passed by means of a pipe 25 to the carburetor casing 26 and thence by means of the pipe 27 to the discharge pipe 24. Normally the major portion of the exhaust would pass around through the pipe 23, but at 28 I have provided a valve which may be so turned as to block the passage of the gases through the pipe 23, thus forcing the exhaust through the heating chamber of the purifier and by means of the by-pass 25, 26 and 27 into the discharge pipe. The valve 28 is designed to be actuated in conjunction with the carburetor valve, and to this end I have provided the rods 29 and 30. The latter leads to the throttle lever, and, when the throttle is opened so that the engine is running at high speed and thus discharging hot gases, the valve 28 is opened to permit a greater portion of these gases to pass directly to the discharge pipe 24, but, when the speed is reduced, this valve is proportionally closed, thus forcing more of the heat through the chamber 6.

The oil is pumped by means of the pump 31 at the bottom of the crank case 32 up through the pipe 33, which, as will be observed, extends upwardly and thence downwardly, and communicates with the interior of the purifier at 34. A pipe 35 communicates with the opening 19, see Figure 1, and extends to the carburetor air inlet 36.

A pipe 37 communicates with the interior of the casing 1 above the inlet 34 but below the heating chamber 6. This pipe 37 extends upwardly and thence downwardly and leads to the oil grooves of the bearings or other parts to be lubricated, shown diagrammatically at 38. A pipe 39 communicates with the opening 20, see Figure 1, and leads to the breather tube 40. The cover 41 of the breather tube is made to fit closely as distinguished from the ordinary breather cap which permits the ready passage of air. It will be noted that both the pipes 37 and 39 are provided with heat radiating fins. At 42 I have shown a branch pipe leading to the oil gauge 43.

From the foregoing description of the various parts of the device, the operation thereof may be readily understood. Let us assume that the oil pump is pumping oil through the pipe 33. The oil enters the interior of the purifier and fills the interior, the major part of the oil passing through the pipe 37 and thence to the points to be lubricated. Another portion of the oil will pass upwardly and will become heated during its passage by the heat in the chamber 6, thereby thinning it and permitting it more readily to pass through the filter 10. Any fuel dilution or water which passes the filter will be heated, the fuel gasified and the water vaporized. These vapors are then drawn through pipe 35 to carburetor intake 36, contributing to fuel charge to the motor. Simultaneously, crank case gases are sucked upward through pipe 39, which ends directly under opening 19, these gases also then being entrained and led to carburetor at point 36. The oil after passing the filter rises to the level 49, shown in Figure 1, forming a shallow heated pool, and overflows at that level into the pipe 39 and is thence taken back to the crank case.

As the oil passes through the filter of course it is relieved of sediment which may have collected therein, and the purified oil passes downwardly through the opening 20 and through the pipe 39, and is delivered into the crank case through the breather tube 40. The oil is cooled by the radiating fins on the pipe 39 so that it reaches the crank case in a cooled condition.

In the meantime, any water which has entered the interior of the casing 1 will settle in the well 2 as will also any heavier matter, such as dirt or sludge. This portion of the purifier, it will be observed, is relatively cool. Furthermore, the oil which is forced through the pipe 37 to the bearings is cooled, so that the bearings receive cooled oil, and that oil which has been heated is cooled in returning it to the crank case.

If the filter should become clogged by neglect, it will not interfere in any way with the efficient operation of the oil system as a whole. It will be noted that all the oil goes into the interior of the purifier, thus giving the oil a chance to be relieved of its water immediately and of settling of the sludge, regardless of the clogging of the filter. It is desirable, however, to change the filter when such clogging takes place. All that is necessary is to turn the cover 17 and remove it, and then to give a slight turn to the bars 12, so as to remove the presser member 10, when the filter may be removed by the handle 11 and replaced by a clean filter, when the parts may be again put together. Should it be desired to flush the purifier, the valve 4 may be opened to permit the water and sludge to drain out, and this may be expedited by the use of a washing fluid, such as kerosene or water, poured in at the top of the purifier, while the latter is open and the filter has been removed.

The pipes 33 and 37, it will be observed, extend upwardly so that when flushing liquids are used they will not enter the pipes. Furthermore, the ends of the pipes are drained of any oil which remains therein.

In the construction described, it will be noted that the crank case is ventilated in the following manner. As the vapors are entrained through the pipe 35 by the air which passes into the carburetor 36, any crank case vapors in the pipe 39 will be sucked through the pipe and on through the pipe 35. The breather top 41, as has been stated, is closed so that the only way for the vapors to get out of the crank case is up through the pipe 39. This pipe serves the double function of carrying the filtered oil back into the crank case and permitting the crank case vapors to ascend and to pass by the pipe 35 to the air intake of the carburetor, where they are mixed with the incoming air.

I claim:

1. In an oil purifying device for internal combustion engines, a chamber having a settling well, means for pumping oil from the crank case into said chamber, whereby a portion of the foreign matter is permitted to settle, means for conducting a clearer portion of the oil to the points of lubrication, means in said chamber for filtering another portion of the oil, and means for conducting the filtered portion of the oil to the crank case.

2. In an oil purifying device for internal combustion engines, a chamber having a settling well, means for pumping oil from the crank case into said chamber, whereby a portion of the foreign matter is permitted to settle, means for conducting a clearer portion of the oil to the points of lubrication, means for heating another portion of the oil, a filter disposed within the chamber for filtering the heated oil, and means for cooling the filtered oil and for returning it to the crank case.

3. In an oil purifying device for internal combustion engines, a chamber having a settling well, means for pumping oil from the crank case into said chamber, whereby a portion of the foreign matter is permitted to settle, means for conducting a clearer portion of the oil to the points of lubrication, means for heating another portion of the oil, a filter disposed within the chamber for filtering the heated oil, means for cooling the filtered oil and for returning it to the crank case, and means for returning volatilized products to the carburetor air intake.

4. The combination with an internal combustion engine having an exhaust manifold, of an oil purifier having a central chamber, a heating chamber surrounding said central chamber and arranged to receive products of combustion from said manifold, a filter disposed within said central chamber in the heated portion thereof, a settling well at the lower portion of said central chamber, means for pumping oil from said crank case and delivering it to said central chamber, whereby a portion of the impurities in the oil are permitted to settle, and a conduit connected with the central chamber above the point of inlet of the oil and below the heated portion of the chamber for conveying a portion of the cleaner oil to the points of lubrication.

5. The combination with an internal combustion engine having an exhaust manifold, of an oil purifier having a central chamber, a heating chamber surrounding said central chamber and arranged to receive products of combustion from said manifold, a filter disposed within said central chamber in the heated portion thereof, a settling well at the lower portion of said central chamber, means for pumping oil from said crank case and delivering it to said central chamber, whereby a portion of the impurities in the oil are permitted to settle, and a conduit connected with the central chamber above the point of inlet of the oil and below the heated portion of the chamber for conveying and cooling a portion of the cleaner oil to the points of lubrication.

6. In an oil purifying device, a casing provided with a settling well at the bottom thereof, means for draining the settling well, the upper part of the casing being provided with an exterior heating chamber for receiving products of combustion, a filter disposed within that part of the casing which is surrounded by the heating chamber, and a removable cover for permitting the withdrawal of the filter.

7. In an oil purifying device, a casing provided with a settling well at the bottom thereof, means for draining the settling well, the upper part of the casing being provided with an exterior heating chamber for receiving products of combustion, a filter disposed within that part of the casing which is surrounded by the heating chamber, removable means for holding the filter in position, and a removable cover for permitting the removal of said holding means and the removal of the filter.

8. In an oil purifier, a casing having a settling well at the bottom thereof, means for draining the settling well, an inlet into said casing above said settling well, an outlet above said inlet, a heating jacket on the outside of the casing above the outlet, a filter disposed within the casing above the outlet, means for supporting the bottom of the filter, removable means for holding the filter against oil pressure, and a cover for said casing, said cover being removable to permit the removal of said filter holding means and the removal of the filter.

9. In an oil purifier, a casing having a settling well at the bottom thereof, means for draining the settling well, an inlet into said casing above said settling well, an outlet above said inlet, a heating jacket on the outside of the casing above the outlet, a filter disposed within the casing above the outlet, means for supporting the bottom of the filter, removable means for holding the filter against oil pressure, a cover for said casing, said cover being removable to permit the removal of said filter holding means and the removal of the filter, an outlet pipe leading to the space above the filter and below the cover, and an oil discharge passage leading from said outlet pipe.

10. In an oil purifier, a casing having a settling well at the bottom thereof, means for draining the settling well, an inlet into said casing above said settling well, an outlet above said inlet, a heating jacket on the outside of the casing above the outlet, a filter disposed within the casing above the outlet, means for supporting the bottom of the filter, removable means for holding the filter against oil pressure, a cover for said casing, said cover being removable to permit the removal of said filter holding means and the removal of the filter, an outlet pipe leading to the space above the filter and below the cover, and a vapor discharge passage leading from said outlet pipe.

11. In an oil purifier for internal combustion engines having an air intake, a chamber, a pipe leading to said air intake from said chamber for drawing vapors therefrom, a pipe communicating with the crank case for delivering vapors to said first named pipe, means for introducing oil from the crank case into the chamber, and means connecting said chamber with said second named pipe for passing filtered oil through said pipe in the opposite direction to the movement of the vapors from the crank case.

DAVID F. ZOOK